United States Patent
Ma et al.

(10) Patent No.: US 9,503,292 B1
(45) Date of Patent: Nov. 22, 2016

(54) METHOD AND DEVICE FOR CALCULATING COEFFICIENTS OF FEED-FORWARD EQUALIZER AND FEED-BACKWARD EQUALIZER IN DECISION FEEDBACK EQUALIZER

(71) Applicant: MStar Semiconductor, Inc., Hsinchu Hsien (TW)

(72) Inventors: Ching-Wen Ma, Hsinchu County (TW); Chih-Cheng Kuo, Hsinchu County (TW); Tai-Lai Tung, Hsinchu County (TW); Chih-Ching Chen, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 14/925,332

(22) Filed: Oct. 28, 2015

(30) Foreign Application Priority Data

Aug. 5, 2015 (TW) .............................. 104125437 A

(51) Int. Cl.
  *H04L 25/03* (2006.01)
(52) U.S. Cl.
  CPC ... *H04L 25/03057* (2013.01); *H04L 25/03171* (2013.01); *H04L 2025/03636* (2013.01)
(58) Field of Classification Search
  CPC .................. H04L 25/03108; H04L 25/03057; H04L 25/03171; H04L 2025/03636; H04L 2025/03649
  See application file for complete search history.

(56) References Cited

U.S. PATENT DOCUMENTS

| | | | | |
|---|---|---|---|---|
| 6,064,703 A * | 5/2000 | Cusani | ............. | H04L 25/03171 375/349 |
| 6,519,282 B1 * | 2/2003 | Huber | ................. | H04L 25/0305 375/232 |
| 6,751,587 B2 * | 6/2004 | Thyssen | ................. | G10L 19/06 704/226 |
| 2005/0169361 A1 * | 8/2005 | Yousef | ...................... | H04L 1/06 375/233 |
| 2006/0222124 A1 * | 10/2006 | Kim | .................. | H04L 25/03038 375/350 |
| 2014/0328380 A1 * | 11/2014 | Pustovalov | ....... | H04L 25/03885 375/232 |

OTHER PUBLICATIONS

Rujiang Wang and Gilles Y. Delisle, "Mitigating Error Propagation of MMSE-DFE by Joint Parameter Optimization", IEEE Transactions on Communications, vol. 57, No. 8, Aug. 2009.*

* cited by examiner

*Primary Examiner* — Aristocratis Fotakis
(74) *Attorney, Agent, or Firm* — WPAT, PC; Justin King; Jonathan Chiang

(57) ABSTRACT

A method for calculating a feed forward equalizer coefficient of a feed forward equalizer in a minimum mean square error decision feedback equalizer (MMSE-DFE) based on a fast transversal recursive least squares (FT-RLS) algorithm is provided. The length of the feed-forward equalizer is $L_F$, which is a positive integer. The method includes an outer iteration having an $L_F$ number of iterations. The outer iteration includes an inner iteration having an n number of iterations, where n is an integer between 0 and $(L_F-2)$.

20 Claims, 8 Drawing Sheets

METHOD AND DEVICE FOR CALCULATING COEFFICIENTS OF FEED-FORWARD EQUALIZER AND FEED-BACKWARD EQUALIZER IN DECISION FEEDBACK EQUALIZER

This application claims the benefit of Taiwan application Serial No. 104125437, filed Aug. 5, 2015, the subject matter of which is incorporated herein by reference.

BACKGROUND OF THE INVENTION

Field of the Invention

The invention relates in general to a decision feedback equalizer, and more particularly, to a method and device for calculating coefficients of a feed-forward equalizer and a feed-backward equalizer in a decision feedback equalizer.

Description of the Related Art

FIG. 1 shows a functional block of a conventional decision feedback equalizer (DFE). A transmitted signal x(n) passes through a channel 10 and is affected by noise r(n) to become an input signal y(n) of a DFE 100, where n represents a time index. The DFE 100 includes a feed-forward equalizer (FFE) 110, a decider 120, a feed-backward equalizer (FBE) 130, a channel estimator 140, an FFE coefficient calculating unit 150, and an FBE coefficient calculating unit 160. One main function of the FFE 110 is processing pre-cursor inter-symbol interference signals and a part of post-cursor inter-symbol interference signals in the input signal y(n). One main function of the FBE 130 is processing post-cursor inter-symbol interference signals in the input signal y(n). The decider 120 then generates a decision signal x'(n) according to filtering results of the FFE 110 and the FBE 130.

An FFE coefficient f the FFE 120 needs for operations and an FBE coefficient b the FBE 130 needs for operations are respectively generated by the FFE coefficient calculating unit 150 and the FBE coefficient calculating unit 160. The FFE coefficient calculating unit 150 generates the FFE coefficient f according to a channel impulse response (CIR) estimation vector h generated from the input signal y(n). The FBE coefficient calculating unit 160 generates the FBE coefficient b according to the CIR estimation vector h and the FFE coefficient f.

SUMMARY OF THE INVENTION

It is an object of the present invention to provide a method for calculating coefficients of a feed-forward equalizer (FFE) and a feed-backward equalizer (FBE) in a decision feedback equalizer (DFE) to enhance the performance of the DFE.

The present invention discloses a method for calculating coefficients of an FFE and an FBE in a minimum mean square error decision feedback equalizer (MMSE-DFE) based on a fast transversal recursive least squares (FT-RLS) algorithm. The length of the feed-forward equalizer is $L_F$ which is a positive integer. The method includes: a) generating a channel impulse response (CIR) estimation vector h according to an input signal of the FFE; b) generating a priori forward prediction error according to the CIR estimation vector h and a forward prediction coefficient vector w; c) providing a minimum cost of forward prediction; d) generating a normalized gain vector c according to the forward prediction coefficient vector w, the minimum cost of forward prediction and the priori forward prediction error; e) providing a posteriori forward prediction error; f) updating the forward prediction coefficient vector w according to the posteriori forward prediction error and the normalized gain vector c; g) providing a conversion factor; and h) generating the FFE coefficient according to the conversion factor and the normalized gain vector c. Steps (a) to (g) are collectively a $1^{st}$ iteration operation having an $L_F$ number of iterations. Step (d) is a $2^{nd}$ iteration operation having an n number of iterations, where n is an integer between 0 and ($L_F-2$).

The present invention further discloses a device for calculating coefficients of an FFE and an FBE in an MMSE-DFE based on a FT-RLS algorithm. The FFE has a length $L_F$, which is a positive integer. The device includes: a priori forward error prediction calculating module, generating a priori forward prediction error $\phi$ according to a channel impulse response (CIR) estimation vector h and a forward prediction coefficient vector w; a minimum forward prediction cost calculating module, providing a minimum cost of forward prediction; a normalized gain vector calculating module, generating a normalized gain vector c according to the forward prediction coefficient vector w, the minimum cost a of forward prediction, and the priori forward prediction error $\phi$; a posteriori forward prediction error calculating module, providing a posteriori forward prediction error $\psi$; a forward prediction coefficient vector calculating module, updating the forward prediction coefficient vector w according to the posteriori forward prediction error $\psi$ and the normalized gain vector c; a conversion factor calculating module, providing a conversion factor $\gamma$; and a control module, controlling an operation sequence of the above modules to complete a $1^{st}$ iteration operation, and generating the FFE coefficient according to the conversion factor $\gamma$ and the normalized gain vector c. Wherein, the $1^{st}$ iteration operation has an $L_F$ number of iterations, and the normalized gain vector calculating module performs a $2^{nd}$ iteration operation having an n number of iterations, where n is an integer between 0 and $L_F-2$.

The method for calculating a fast FFE coefficient of a DFE of the present invention simplifies the iteration during a computation process to reduce the number of iterations and to accelerate the processes of calculating the coefficients of the FFE and FBE, thereby enhancing the performance of the DFE.

The above and other aspects of the invention will become better understood with regard to the following detailed description of the preferred but non-limiting embodiments. The following description is made with reference to the accompanying drawings.

DETAILED DESCRIPTION OF THE INVENTION

In possible implementation, one person having ordinary skill in the art can realize the present invention by selecting equivalent elements or steps based on the disclosure of the application. That is, the implementation of the present invention is not limited to the following embodiments.

Figure 1:
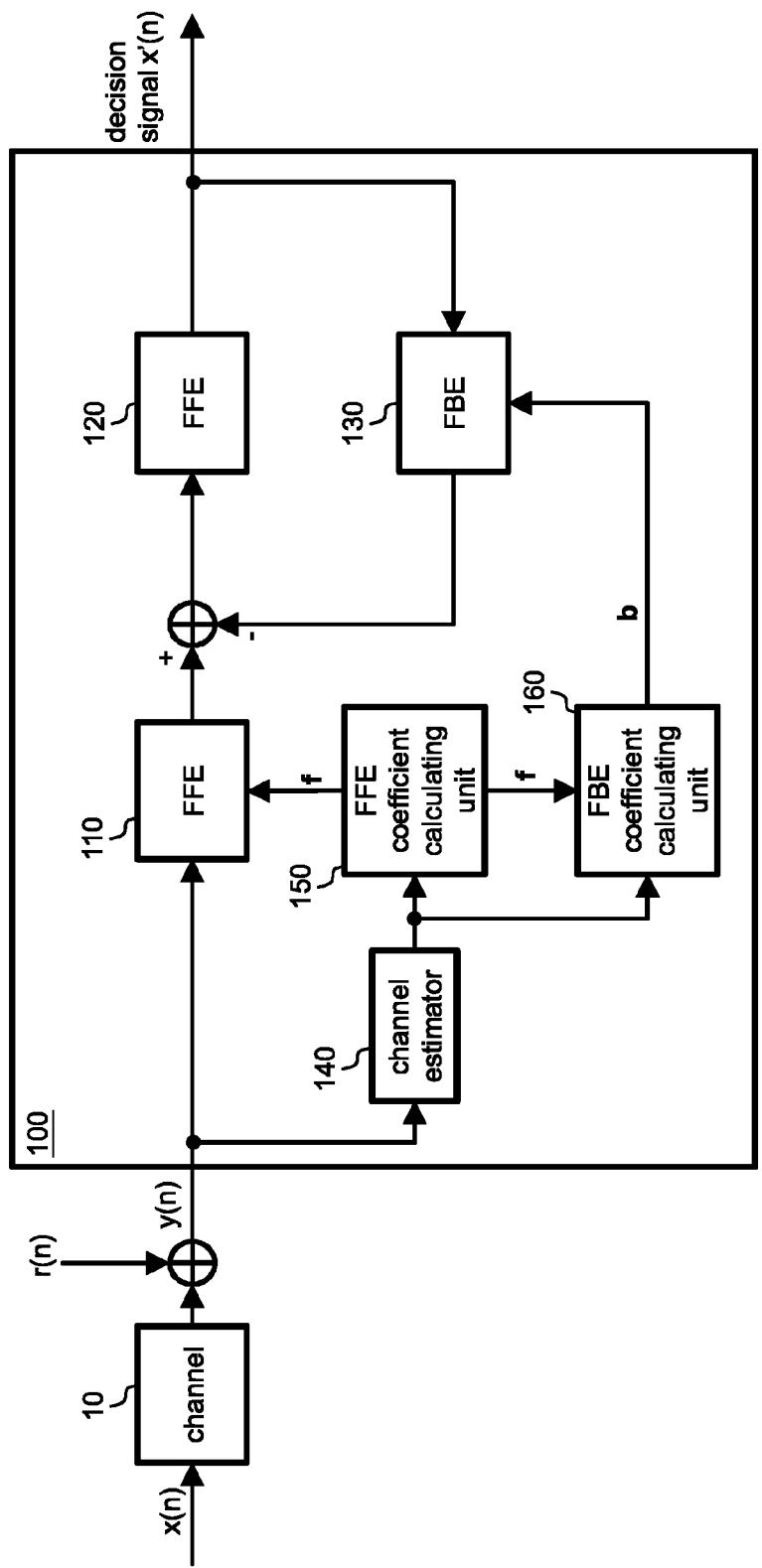
FIG. 1 is a functional block diagram of a conventional decision feedback equalizer (DFE)
Figure 2:
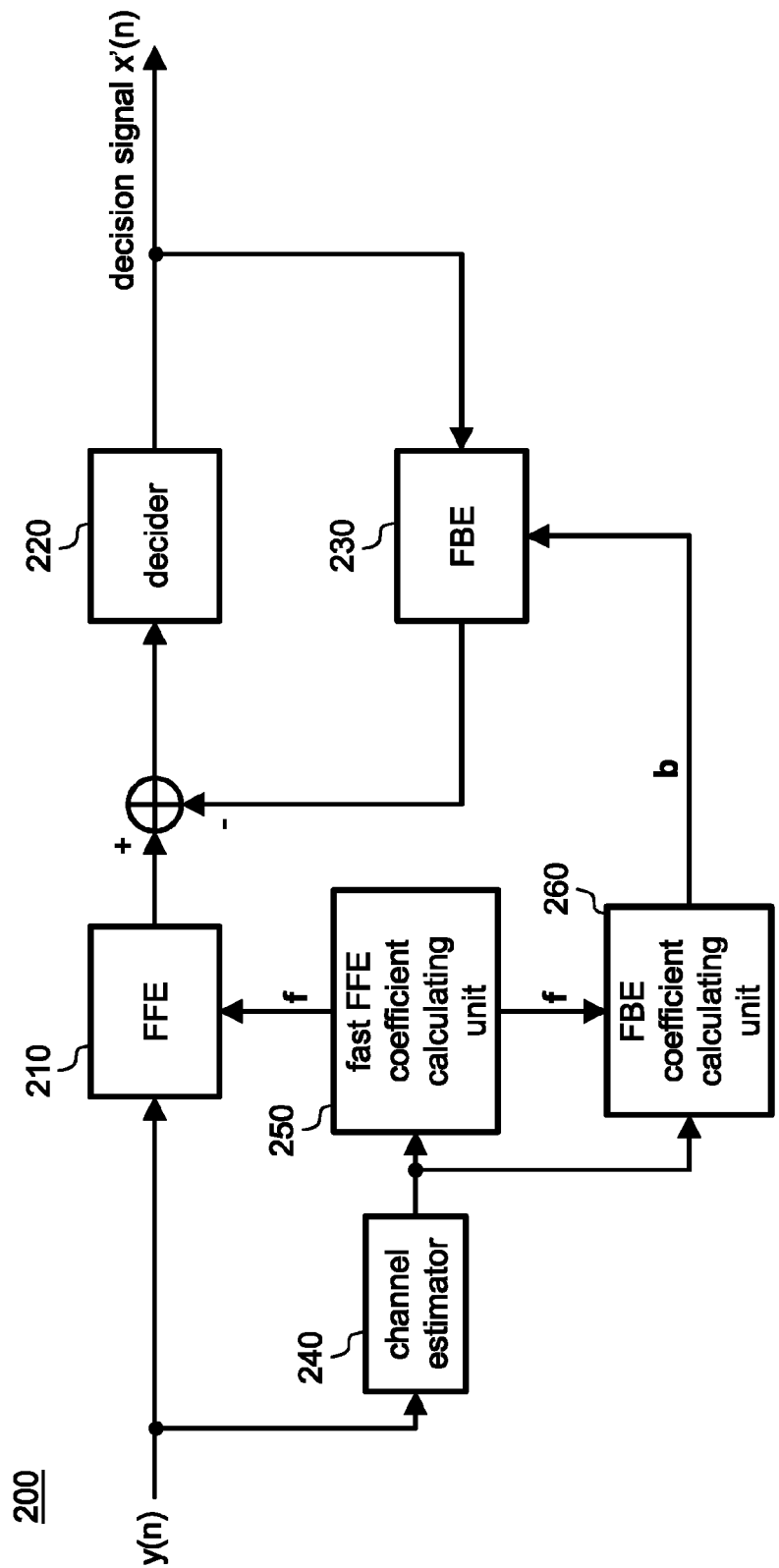
FIG. 2 is a functional block diagram of a DFE according to an embodiment of the present invention.

FIG. 2 shows a functional block diagram of a decision feedback equalizer (DFE) according to an embodiment of the present invention. The DFE 200 includes a feed-forward equalizer (FFE) 210, a decider 220, a feed-backward equalizer 230, a channel estimator 240, a fast FFE coefficient calculating unit 250 and a FBE coefficient calculating unit 260. The DFE 200 is a minimum mean square error decision feedback equalizer (MMSE-DFE), and features an advantage of leaving noise r(n) unamplified. The fast FFE coefficient calculating unit 250 and the FBE coefficient calculating unit 260 apply a fast transversal recursive least squares (FT-RLS) algorithm to calculate the FFE coefficient f and the FBE coefficient b, and feature an advantage of having a fast convergence speed. The present invention further reduces the computation amount. In the FT-RLS algorithm, the FFE coefficient f and the FBE coefficient b may be represented as follows:

$$f = ((\Phi_{hh} - HH^H)) + \sigma_n^2 I)^{-1} h \quad (1)$$

$$b = H^H \times f \quad (2)$$

In the above equations, the CIR estimation vector $h = [h(\Delta)h(\Delta-1) \ldots h(\Delta-L_F+1)]$, where $\Delta$ represents a decision delay, $L_F$ is the length of the FFE 210, the FFE 210 is an $(L_F-1)$-order equalizer and $L_F$ is a positive integer, $\Phi_{hh}$ represents a channel autocorrelation matrix, $\sigma_n^2$ represents noise energy, I represents a unit matrix, and the CIR estimation matrix H may be represented as:

$$H = \begin{bmatrix} h(\Delta+1) & \ldots & h(\Delta+L_B-1) \\ h(\Delta) & \ldots & h(\Delta+L_B-2) \\ \vdots & \ddots & \vdots \\ h(\Delta-L_F+2) & \ldots & h(\Delta+L_B-L_F) \end{bmatrix} \quad (3)$$

Wherein, $L_B$ is the length of the FBE 230, the FEB 230 is an $(L_B-1)$-order equalizer, and $L_B$ is similarly a positive integer.

When calculating the FFE coefficient f in equation (1) using the FT-RLS algorithm, the following iteration operation is performed. The number of iterations is determined according to the length $L_F$ of the FFE 220, and the following is performed for $L_F$:

1. updating a priori forward prediction error $\phi$;
2. updating a posteriori forward prediction error $\psi$;
3. updating a minimum cost of the forward predictor $\alpha$;
4. updating a conversion factor $\gamma$;
5. updating a normalized gain factor c; and
6. updating a forward prediction coefficient vector w.

The above iteration may be presented by a pseudo code, where "//" and the text on its right represent notes in the equation, and a parameter i is for controlling the progressing of the iteration:

```
// set initial value
γ = 1
w = 0
c = 0
α = 2
// start iteration calculation
for ( i=0; i<L_F; i++) {
  φ = h[i];
  for (j=i-1, k=0; j>=0; j--, k++) {       //step1
  φ = φ - h[j] ×w[k];
  }
  calculate ψ,α, γ   //steps 2, 3, 4 calculate next c[0] = φ*/α  // step 5 initial calculation for (j=1; j <L_F; j++) {                  //step 5 next c[j] = c[j – 1] - (φ*/α) w[j – 1]

}
  for (j=0;j<L_F; j++) {                    // step 6
    next w[j] = w[j] + c[j] × ψ
  }
  for (j=0;j<L_F; j++) {
    c[j] = next c[j]
    w[j] = next w[j]
  }
}
...
f=c × y
```

After having performed the iteration operation including steps 1 to 6, the FFE coefficient f may then be updated according to the normalized gain vector c and the conversion factor $\gamma$. Details of the calculation in steps 2, 3 and 4 are generally known to one person having ordinary skill in the art, and shall be omitted in the above pseudo code.

The above pseudo code includes two layers of iteration operations—the outer iteration including above steps 1 to 6, and step 1, step 5 and step 6 that are respectively inner iterations. As steps 2, 3 and 4 do not involve iterative scalar operations, these steps have a lower computation complexity level. On the other hand, as steps 1, 5 and 6 involve iterative vector operations, these steps are key factors that affect the computation complexity of the above pseudo code. Further, the number of iterations of the inner iteration in step 1 is associated with the value of the parameter i, and the inner iteration in step 1 has a computation complexity of approximately $O(0.5L_F^2)$. The numbers of times of iterations of the inner iterations in steps 5 and 6 are associated with the value of the length $L_F$ of the FFE 220, and each of the inner iterations in steps 5 and 6 has a computation complexity of approximately $O(L_F^2)$. The total computation complexity of steps 2, 3 and 4 is approximately $O(2.5L_F^2 + L_F)$. The performance of the DFE can be effectively enhanced if the computation complexity of the FFE coefficient calculating unit can be lowered.

It is discovered through analysis that, step 5 of calculating the normalized gain vector c and step 6 of calculating the forward prediction coefficient vector w involve numerous computations of 0. More specifically, in different outer iterations, the normalized gain vector c and the forward prediction coefficient vector w are respectively represented by 1 and 2, wherein "x" only represents non-zero values instead of representing the same value.

TABLE 1

Normalized gain vector c

| $N^{th}$ iteration | c[0] | c[1] | c[2] | c[3] | c[4] | ... | c[$L_F$-1] |
|---|---|---|---|---|---|---|---|
| 1 | x | 0 | 0 | 0 | 0 | ... | 0 |
| 2 | x | x | 0 | 0 | 0 | ... | 0 |
| 3 | x | x | x | 0 | 0 | ... | 0 |
| 4 | x | x | x | x | 0 | ... | 0 |
| 5 | x | x | x | x | x | ... | 0 |
| ... | ... | ... | ... | ... | ... | ... | 0 |
| $L_F$ | x | x | x | x | x | ... | x |

TABLE 2

Forward prediction coefficient vector w

| $N^{th}$ iteration | w[0] | w[1] | w[2] | w[3] | w[4] | ... | w[$L_F$-1] |
|---|---|---|---|---|---|---|---|
| 1 | x | 0 | 0 | 0 | 0 | ... | 0 |
| 2 | x | x | 0 | 0 | 0 | ... | 0 |
| 3 | x | x | x | 0 | 0 | ... | 0 |
| 4 | x | x | x | x | 0 | ... | 0 |
| 5 | x | x | x | x | x | ... | 0 |
| ... | ... | ... | ... | ... | ... | ... | 0 |
| $L_F$ | x | x | x | x | x | ... | x |

It is discovered from Table-1 and Table-2 that, after the $1^{st}$ iteration (i=0) of the outer iteration, in the normalized gain vector c, apart from the element c[0], all the remaining elements are 0; in the forward prediction coefficient vector w, all the elements are 0. After the $2^{nd}$ iteration (i=1) of the outer iteration, in the normalized gain vector c, apart from the elements c[0] and c[1], all the remaining elements are 0; in the forward prediction coefficient vector w, apart from the element w[0], all the remaining elements are 0. The other iterations of the outer iteration are deduced accordingly. After the $L_F^{th}$ iteration (i=$L_F$-1) of the outer iteration, all of the elements in the normalized gain vector c are non-zero, and only the element w[$L_F$-1] in the forward prediction coefficient vector w is zero. It should be noted that, in this embodiment, i=0 corresponds to the $1^{st}$ iteration of the outer iteration, i=1 corresponds to the $2^{nd}$ iteration of the outer iteration, and so forth. In other embodiments, the initial value of the parameter i and the amount of change between two successive iterations may be different, and thus the $N^{th}$ iteration is in fact the number of iterations.

According to the above analysis, when the inner iteration of steps 5 and 6 are performed, instead of also computing the elements in 0 in the normalized gain vector c and the forward prediction coefficient vector w, only the non-zero elements in the normalized gain vector c and the forward prediction coefficient vector w are computed to save the computing time and hardware resources of the FFE coefficient calculating unit. More specifically, the number of iterations of the inner iteration (associated with the control parameter j) may be adjusted according to the number N of iterations (i.e., the $N^{th}$ iteration) currently performed in the outer iteration to reduce the computation amount of the inner iteration, where N=1~$L_F$. The pseudo code after the adjusted step 5 is as follows:

```
for (j=1 ; j < i+1 ; j++) {          //step 5
    next c[j] = c[j – 1] – $\frac{\phi^*}{\alpha}$ w[j – 1]
}
```

In the $N^{th}$ outer iteration, the number of iterations of step 5 is reduced from $L_F$-1 to N-1 times. More specifically, in the $1^{st}$ outer iteration (N=1), the number of iterations of step 5 is reduced from $L_F$-1 to 0 (i.e., no computation is required); in the $2^{nd}$ outer iteration (N=2), the number of iterations of step 5 is reduced from $L_F$-1 to 1; in the $3^{rd}$ outer iteration (N=3), the number of iterations of step 5 is reduced from $L_F$-1 to 2; . . . ; in the $(L_F-1)^{th}$ outer iteration (N=$L_F$-1), the number of iterations of step 5 is reduced from $L_F$-1 to $L_F$-2; and in the $L_F^{th}$ outer iteration (N=$L_F$), the number of iterations of step 5 is kept unchanged as $L_F$-1. It is known that, the adjusted step 5 for calculating the normalized gain vector c has a computation complexity reduced from approximately $O(L_F^2)$ to $O(0.5L_F^2)$, and the computation amount of the fast FFE coefficient calculating unit 250 is reduced to a half of the original amount.

Similarly, the pseudo code of adjusted step 6 is as follows:

```
for (j=0 ; j<i ; j++) {              //step 6
    next w[j] = w[j] + c[j] × ψ
}
```

In the $N^{th}$ outer iteration, the number of iterations of step 6 is reduced from $L_F$-1 to N-1 times. More specifically, in the $1^{st}$ outer iteration (N=1), the number of iterations of step 6 is reduced from $L_F$-1 to 0 (i.e., no computation is required); in the $2^{nd}$ outer iteration (N=2), the number of iterations of step 6 is reduced from $L_F$-1 to 1; in the $3^{rd}$ outer iteration (N=3), the number of iterations of step 6 is reduced from $L_F$-1 to 2; . . . ; in the $(L_F-1)^{th}$ outer iteration (N=$L_F$-1), the number of iterations of step 6 is reduced from $L_F$-1 to $L_F$-2; and in the $L_F^{th}$ outer iteration (N=$L_F$), the number of iterations of step 6 is reduced to $L_F$-1. It is known that, the adjusted step 6 for calculating the normalized gain vector c has a computation complexity reduced from approximately $O(L_F^2)$ to $O(0.5L_F^2)$, and the computation amount of the fast FFE coefficient calculating unit 250 is reduced to a half of the original amount.

It should be noted that, the initial value of the control parameter j and the amount of change between two successive inner iterations may be different, and are correspondingly changed according to equations inside the loop. Such details are generally known to one person having ordinary skill in the art. Thus, the implementation of the present invention is not limited to the above pseudo code.

Figure 3:
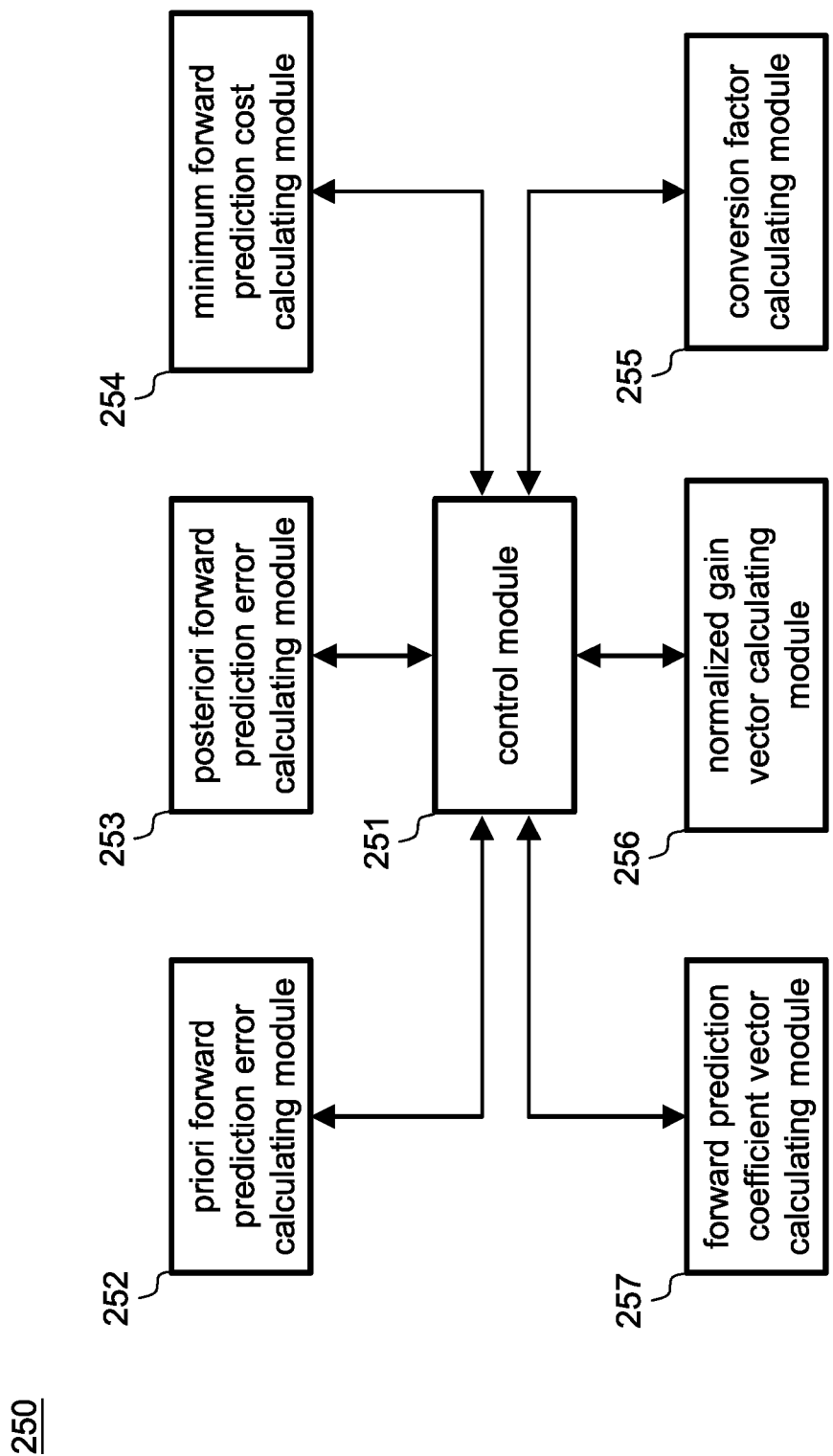
FIG. 3 is a functional block diagram of a fast FFE calculating unit according to an embodiment of the present invention.
Figure 4:
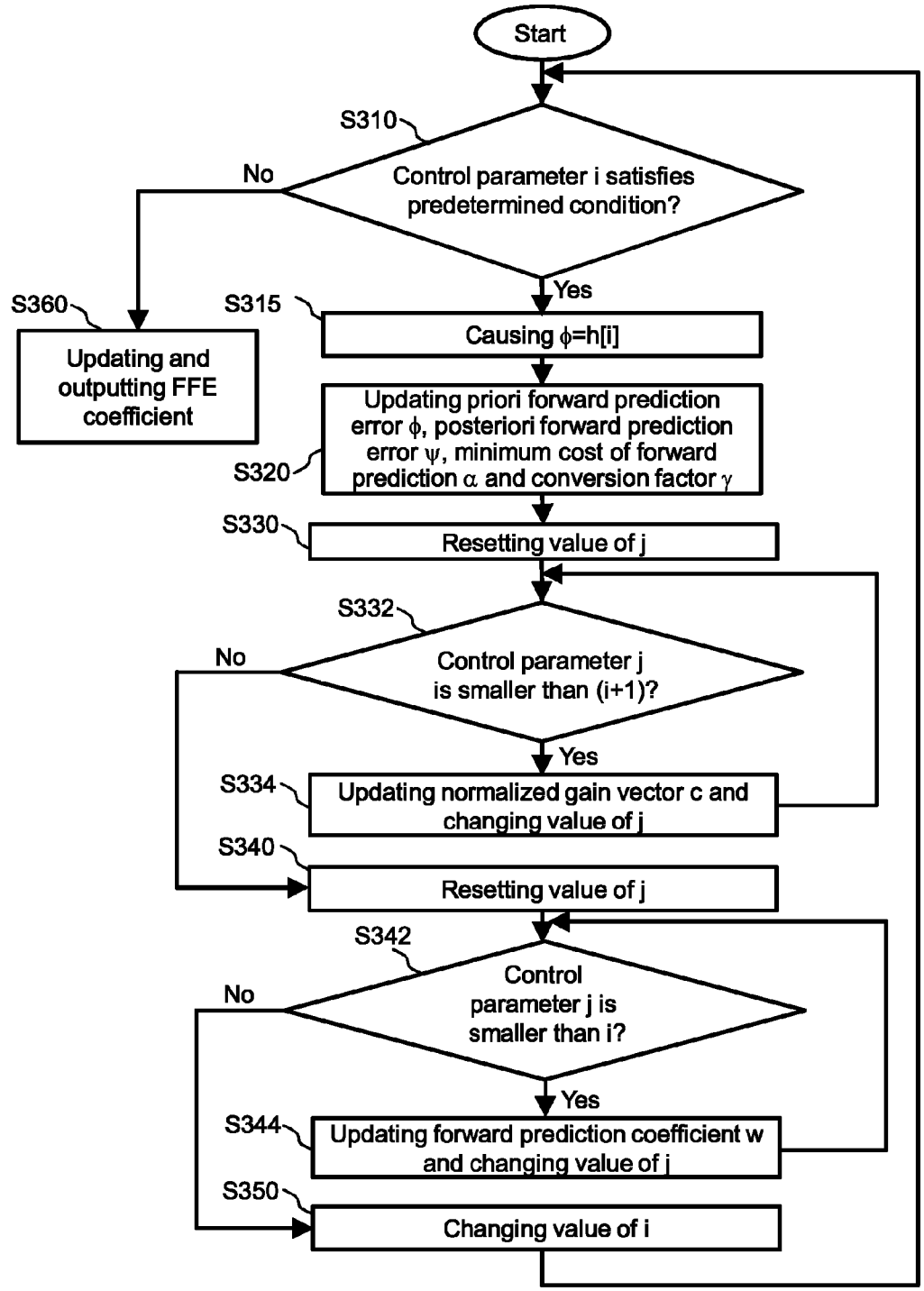
FIG. 4 is a flowchart of calculating the FFE coefficient f according to an embodiment of the present invention.

FIG. 3 shows a functional block diagram of a fast FFE coefficient calculating unit 250 according to an embodiment of the present invention. The fast FFE coefficient calculating unit 250 includes a control module 251, a priori forward prediction error calculating module 252, a posteriori forward prediction error calculating module 253, a minimum forward predictor cost calculating module 254, a conversion factor calculating module 255, a normalized gain vector calculating module 256, and a forward prediction coefficient vector calculating module 257. FIG. 4 shows a flowchart of a control module of the fast FFE coefficient calculating unit 250 of the present invention. First, the control module 251 determines whether to perform an outer iteration according to whether the control parameter i satisfies a predetermined condition (step S310). If the outer iteration is complete (a determination result of step S310 is negative), the control module 251 updates and outputs the FFE coefficient f (step S360). If the outer iteration is not complete (the determination result of step S310 is affirmative), the control module 251 causes the priori forward prediction error calculating module 252 to initialize the priori forward prediction error $\phi$, i.e., setting the initial value of the priori forward prediction error $\phi$ to be equal to h[i] (step S315) (h representing the CIR estimation vector). The control module 251 then controls the priori forward prediction error calculating module 252, the posteriori forward prediction error calculating module 252, the minimum forward predictor cost calculating module 252 and the conversion factor calculating module 255 to respectively update the parameters $\phi$, $\psi$, $\alpha$ and $\gamma$ (step S320, corresponding to steps 1 to 4 of the pseudo code). The subsequent steps S330, S332 and S334 are a $1^{st}$ inner iteration (corresponding to step 5 of the pseudo code), in which the control module 251 controls the normalized gain vector calculating module 256 according to the control parameter j to perform the iteration for updating the normalized gain vector c. It should be noted that, the control module 251 determines whether to perform the inner iteration by comparing the control parameter j with the control parameter i, implying that the number of iterations of the inner iteration is in fact associated with the number N of iterations of the outer iteration. The subsequent steps S340, S342 and S344 are the $2^{nd}$ inner iteration (corresponding to step 6 of the pseudo code), in which the control module 251 controls the forward prediction coefficient vector calculating module 257 according to the control parameter j to perform the iteration for updating the forward prediction coefficient vector w. The control parameter i is changed in step S350.

Figure 5:
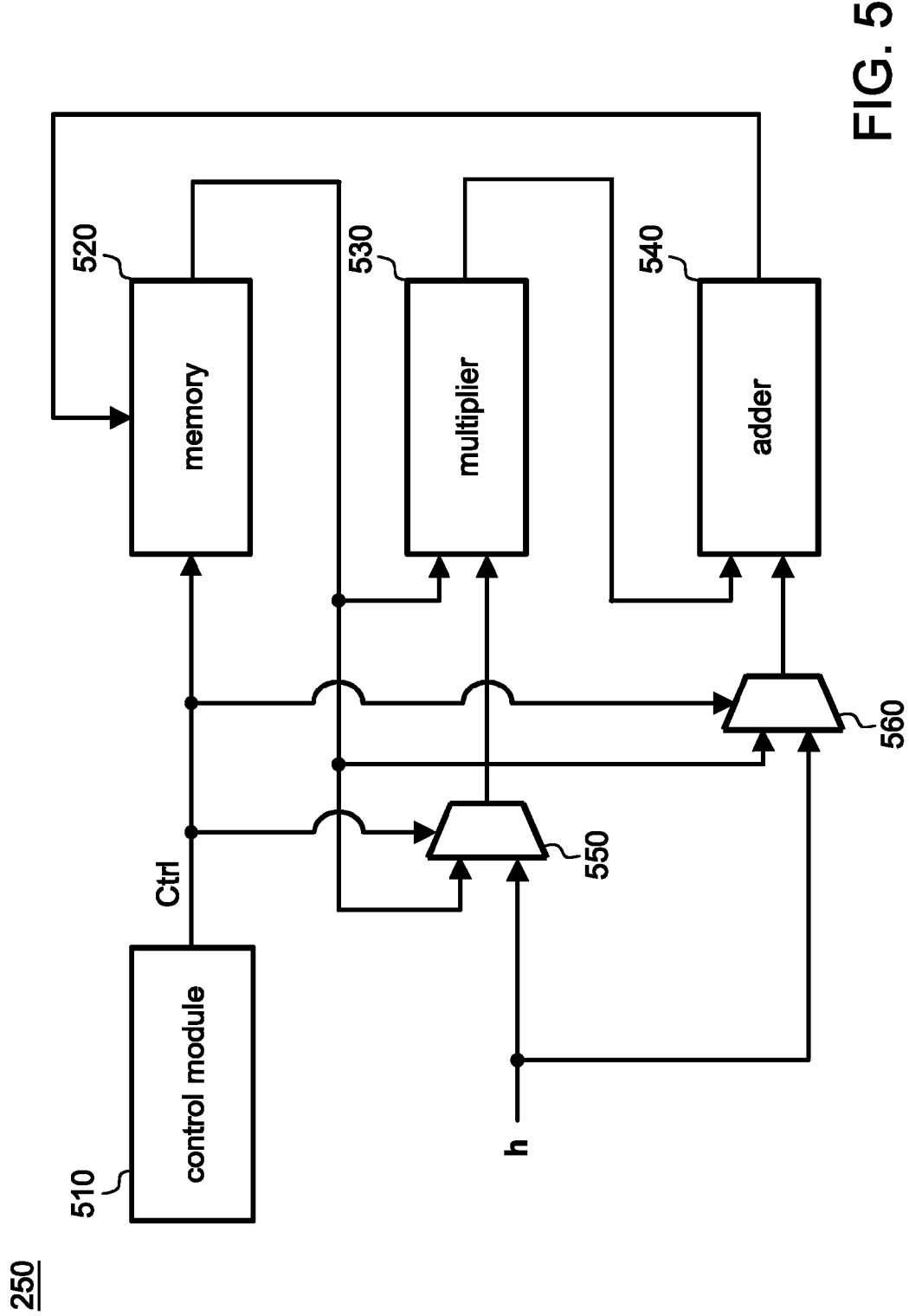
FIG. 5 is a functional block diagram of a fast FFE coefficient calculating unit implemented by a hardware circuit according to an embodiment of the present invention.

In practice, the fast FFE coefficient calculating unit 250 may be implemented by a hardware circuit. FIG. 5 shows the fast FFE coefficient calculating unit 250 in FIG. 3 implemented by a hardware circuit. For example, a control module 510 is a hardware logic circuit based on a finite state machine and controls the progressing of the process in FIG. 4. According to a control signal Ctrl outputted by the control module 510, multiplexers 550 and 560 select to output the CIR estimation vector h or values (e.g., the above parameters $\phi$, $\psi$, $\alpha$, $\gamma$, c and w) temporarily stored in a memory 520 to a multiplier 530 and an adder 540. The multiplier 530 and the adder 540 respectively perform multiplication and addition in the steps. The modules in FIG. 3 realize respective functions by executing corresponding codes through the hardware in FIG. 5.

It is known from the pseudo code that, step S334 in fact includes a multiplication $$\frac{\phi^*}{\alpha} \times w[j-1]$$

and a subtraction $$c[j-1] - \left[\frac{\phi^*}{\alpha} \times w[j-1]\right].$$

Figure 6:
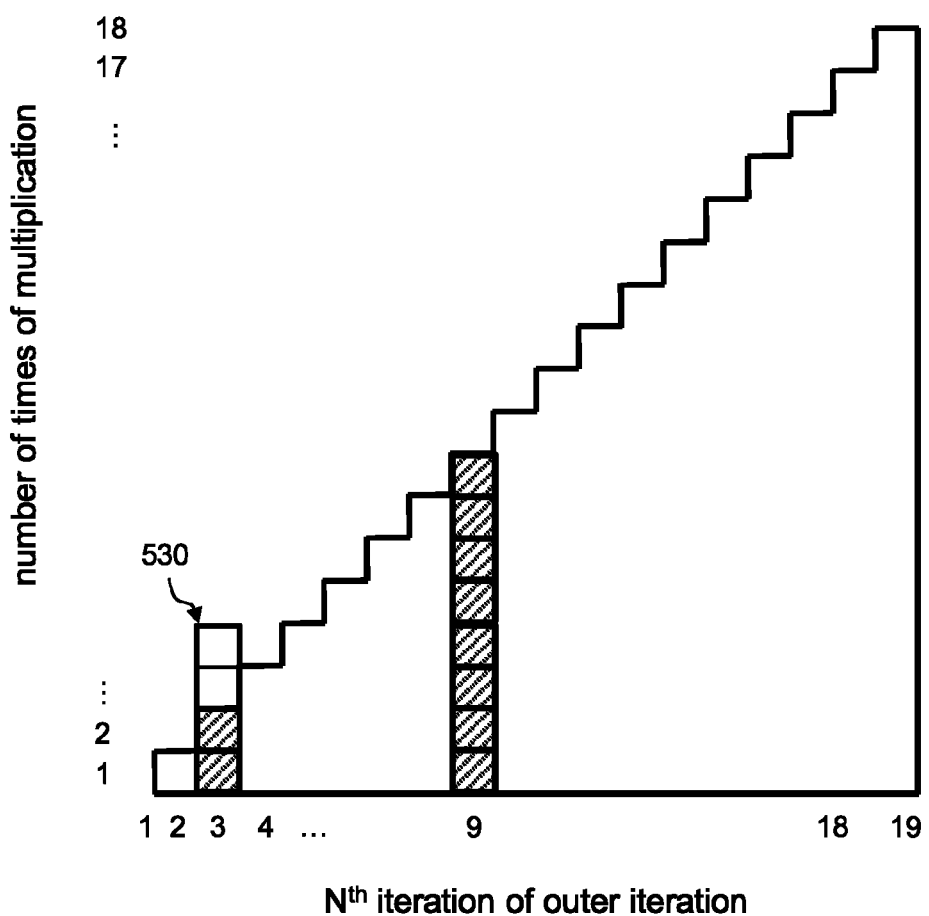
FIG. 6 is a diagram of a relationship between a multiplication computation amount and a multiplication array of the present invention.

The multiplication consumes more hardware resources and time, and is thus the main target of discussion. The multiplier 530 of the fast FFE coefficient calculating unit 250 is in fact a multiplication array (including a plurality of multiplying units) for performing the above multiplication. FIG. 6 shows a diagram of a relationship between a multiplication computation amount and a multiplication array. $L_F=19$ is taken as an example. It is assumed that the multiplier 530 includes 4 multiplying units. When N=3, step S334 is performed twice (because the number of the inner iteration is N−1), and so the multiplier 530 uses two of the multiplying units (the shaded parts); when N=9, step S332 is performed eight times, and the multiplier 530 is used twice (equivalent to eight multiplying units) to complete the required multiplication; and so forth. In a conventional method, regardless of the sequence of the outer iteration (regardless of the number N of iterations), step S334 is performed 18 times. Thus, even for the $1^{st}$ iteration (N=1, and the multiplier 530 is not used in the present invention), the multiplier 530 is used for more than four times. Comparing the two, it is discovered that, 1) under the same hardware resources, the time that the fast FFE coefficient calculating unit 250 of the present invention requires is only about one half of the time that the conventional method requires; or 2) given the computation needs to be completed within the same amount of time, hardware costs of the fast FFE coefficient calculating unit 250 are only about one half of those of the conventional method.

The same deduction applies to the $2^{nd}$ inner iteration (i.e., corresponding to step 6 of the pseudo code) corresponding to steps S340, S342 and S344. That is, step 6 of the pseudo code also saves one half of the time or one half of the hardware costs. Therefore, in the process in FIG. 4, when the number of iterations of the $1^{st}$ and $2^{nd}$ inner iterations are associated with the number N of iterations of the outer iteration, the computing time of the FFE coefficient calculating unit can be saved to further significantly improve the performance of the FFE coefficient calculating unit. As such, not only the speed of generating the FFE coefficient f but also the speed at which the FBE coefficient calculating unit generates the FBE coefficient b is accelerated, thereby enhancing the overall performance of the DFE or saving hardware resources of the FFE coefficient calculating unit.

In fact, step 1 for calculating the priori forward prediction error (I) is also an iteration. Reducing the computation amount of the iteration helps saving the computing time of the FFE coefficient calculating unit to further enhance the performance of the DFE or to save hardware resources of the FFE coefficient calculating unit. It is known from step 1 of the pseudo code that, the priori forward prediction error $\phi=\phi-h[j]\times w[k]$, where h[j] represents an element of the CIR estimation vector h. The CIR estimation vector h includes an $L_F$ number of elements, where $L_F$ is the length of the FFE 220. For example, the $L_F$ number of elements of the CIR estimation vector h are h[0], h[1], ..., and h[$L_F$−1]. Further, the number of iterations in step 1 is determined by the number N of iterations the outer iteration currently performs. For example, in the $1^{st}$ outer iteration (N=1), the number of iterations of step 1 is zero (i.e., no computation is needed); in the $2^{nd}$ outer iteration (N=2), step 1 performs the iteration according to h[0] and has a number of iterations of 1; in the $3^{rd}$ outer iteration (N=3), step 1 performs the iteration according to h[1]~h[0] and has a number of iterations of 2; in the $4^{th}$ outer iteration (N=4), step 1 performs the iteration according to h[2]~h[0] and has a number of iterations of 3; ...; in the $(L_F−1)^{th}$ outer iteration (N=$L_F$−1), step 1 performs the iteration according to h[$L_F$−2]~h[0] and has a number of iterations of $L_F$−2; and in the $L_F^{th}$ outer iteration (N=$L_F$), step 1 performs the iteration according to h[$L_F$−1]~h[0] and has a number of iterations of $L_F$−1. However, in most circumstances, only an $L_{CIR}$ number of elements in the $L_F$ number of elements of the CIR estimation vector h are greater than a predetermined value ($L_{CIR}$<$L_F$), whereas the remaining number ($L_F$-$L_{CIR}$) of elements are smaller than the predetermined value and may be regarded as zero, wherein $L_{CIR}$ may be regarded as the length of the CIR estimation vector h. For example, if an $L_F$ number of elements of the CIR estimation vector h are h[0]~h[$L_F$-1], $L_{CIR}$ number of elements h[0]~h[$L_F$-1] are greater than a predetermined value, the remaining number ($L_F$-$L_{CIR}$) of elements are smaller than the predetermined value and may be regarded as zero. According to the equation φ=φ-h[j]×w[k] of the priori forward estimation error φ in step 1, it is known that, when h[j]=0, φ is unchanged.

According to the above analysis, when the inner iteration of step 1 is performed, instead of also computing elements that are smaller than the predetermined value and may be regarded as zero elements in the CIR estimation vector h, only elements that are greater than the predetermined value (e.g., h[0]~h[$L_{CIR}$-1]) in the CIR estimation vector h are computed, so as to reduce the computing time or hardware resources of the FFE coefficient calculating unit. For example, the computation is performed only when the control parameter j is smaller than the length $L_{CIR}$ of the CIR estimation vector h. The pseudo code of the adjusted step 1 is as follows:

```
for (j=i-1 , k=0; j>=0; j--, k++) {      //step 1
    if (j <L_CIR)
    φ -= h[j] × w[k];
}
```

Figure 7:
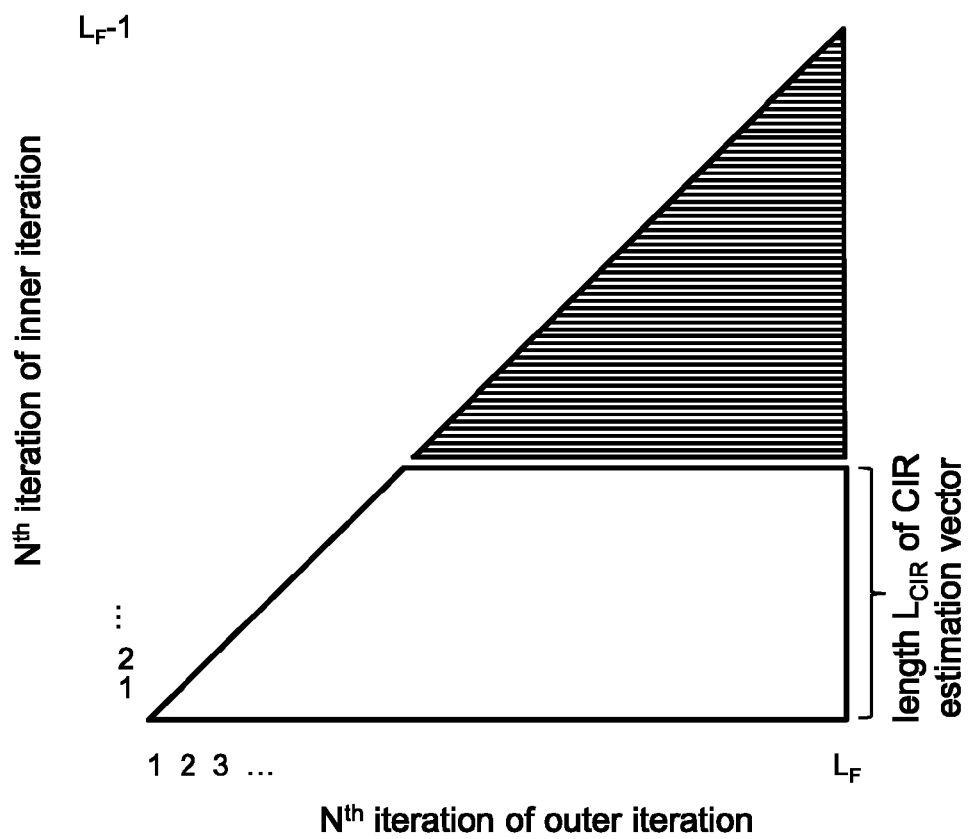
FIG. 7 is a comparison diagram of computation amounts for updating a priori forward prediction error of a conventional solution and the present invention.

Referring to FIG. 7 for the achieved effect, regardless of the number N of iterations of the outer iteration, the number of iterations of step 1 does not exceed the length $L_{CIR}$ of the CIR estimation vector h. That is to say, during the entire process of the outer iteration, the adjusted step 1 saves the computation amount represented by the shaded area.

Figure 8A:
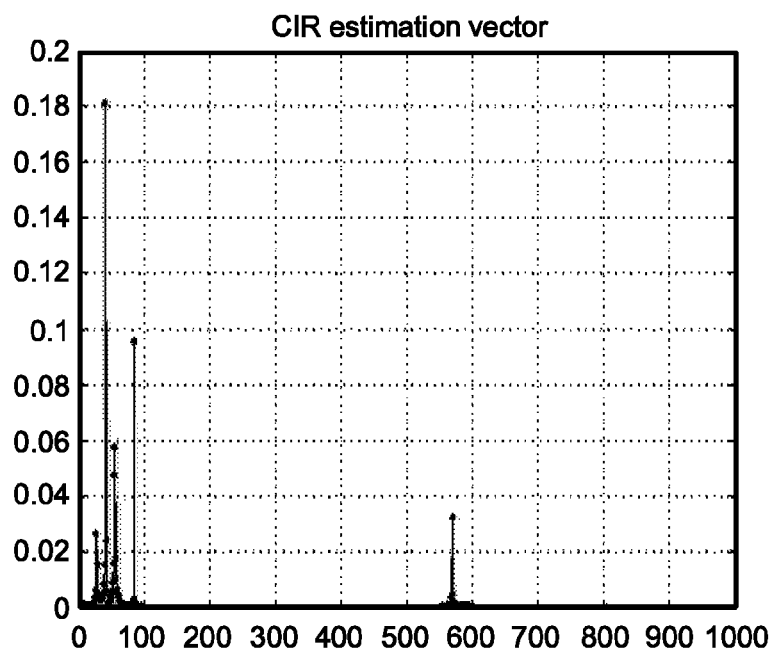
FIG. 8A is a waveform diagram of the CIR estimation vector h.
Figure 8B:
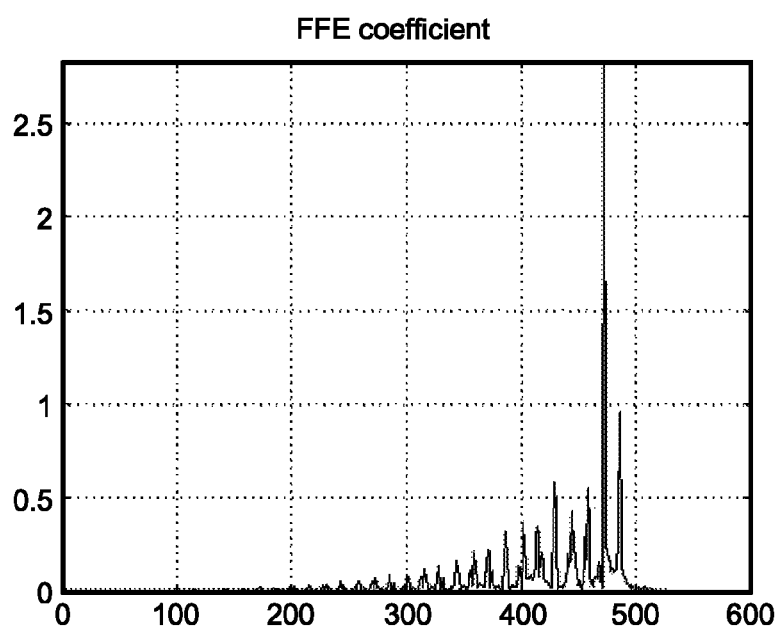
FIG. 8B is a waveform diagram of the FFE coefficient f.

In addition to reducing the computation amount of the FFE coefficient calculating unit by adjusting the computing approaches of steps 1, 5 and 6 of equation (1), the present invention is also capable of reducing the computation amount of the FBE coefficient calculating unit by adjusting the computing approach of equation (2). In one embodiment, as shown by the waveforms of the CIR estimation vector h and the FFE coefficient f in FIG. 8A and FIG. 8B, respectively, it is found that most parts of the waveforms in FIG. 8A and FIG. 8B are zero. It is also known from equation (2) that, the FBE coefficient b is the product of the two (b=$H^H$×f), such that the FBE coefficient calculating unit may calculate the FBE coefficient only when both of them are non-zero, thereby significantly reducing the computation amount of the FBE coefficient calculating unit.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for calculating a feed-forward equalizer (FFE) coefficient of an FFE in a minimum mean square error decision feedback equalizer (MMSE-DFE) based on a fast transversal recursive squares (FT-RLS) algorithm, the FFE having a length $L_F$, $L_F$ being a positive integer, the method comprising:
   a) generating a channel impulse response (CIR) estimation vector h according to an input signal of the FFE;
   b) generating a priori forward prediction error φ according to the CIR estimation vector h and a forward prediction coefficient vector w;
   c) providing a minimum cost of forward prediction α;
   d) generating a normalized gain vector c according to the forward prediction coefficient vector w, the minimum cost of forward prediction α and the priori forward prediction error φ, wherein the normalized gain vector c includes elements c[0] to c[$L_F$];
   e) providing a posteriori forward prediction error ψ
   f) updating the forward prediction coefficient vector w according to the posteriori forward prediction error ψ and the normalized gain vector c;
   g) providing a conversion factor γ;
   h) generating the FFE coefficient according to the conversion factor γ and the normalized gain vector c; and updating the FFE with said FFE coefficient;
   wherein, step (a) to step (g) are collectively a $1^{st}$ iteration operation and have an $L_F$ number of iterations; step (d) is a $2^{nd}$ iteration operation having an n number of iterations, and wherein in the $N^{th}$ iteration of the $L_F$ iterations of the $1^{st}$ iteration operation, the number of iterations of the $2^{nd}$ iteration operation n equals N−1; the $2^{nd}$ iteration operation computes the elements c[1] to c[N−1], and directly sets the elements c[N] to c[$L_F$] to 0 instead of computing the elements c[N] to c[$L_F$].

2. The method according to claim 1, wherein in the $1^{st}$ iteration of the $L_F$ iterations of the $1^{st}$ iteration operation, the elements c[1] to c[$L_F$] are not computed and are directly set to 0.

3. The method according to claim 1, wherein step (f) is a $3^{rd}$ iteration operation having an m number of iterations, where m is an integer between 0 and ($L_F$−1).

4. The method according to claim 3, wherein in the $M^{th}$ iteration of the $L_F$ iterations of the $1^{st}$ iteration operation, the iteration number of the $3^{rd}$ iteration operation m is an integer between (M−1) and $L_F$.

5. The method according to claim 4, wherein the forward prediction coefficient vector w includes elements w[0] to w[$L_F$−1]; in the $M^{th}$ iteration of the $L_F$ iterations of the $1^{st}$ iteration operation, the $3^{rd}$ iteration operation comprises computing the elements w[0] to w[M−2], where M is an integer greater than 1.

6. The method according to claim 5, wherein in the $M^{th}$ iteration of the $L_F$ iterations of the $1^{st}$ iteration operation, the iteration number of the $3^{rd}$ iteration operation m equals M−1; the $3^{rd}$ iteration operation computes the elements w[0] to w[M−2], and directly sets the elements w[M−1] to w[$L_F$−1] to 0 instead of computing the elements w[M−1] to w[$L_F$−1].

7. The method according to claim 6, in the $1^{st}$ iteration of the $L_F$ iterations of the $1^{st}$ iteration operation, the elements w[0] to w[$L_F$] are not computed and are directly set to 0.

8. The method according to claim 1, wherein the CIR estimation vector h includes an $L_F$ number of elements and has a length $L_{CIR}$, the length $L_{CIR}$ is a positive integer and is smaller than $L_F$; step (b) is a $4^{th}$ iteration operation having a p number of iterations; in the $P^{th}$ iteration of the $L_F$ iterations of the $1^{st}$ iteration operation, and the iteration number of the $4^{th}$ iteration operation p is an integer between $L_{CIR}$ to (P−2), where P is an integer between ($L_{CIR}$+2) and $L_F$.

9. The method according to claim 8, wherein the CIR estimation vector h includes elements h[0] to h[$L_F$−1]; the elements h[0] to h[$L_{CIR}$−1] are greater than a predetermined value, and the elements h[$L_{CIR}$] to h[$L_F$−1] are smaller than the predetermined value; in the $P^{th}$ iteration of the $L_F$ iterations of the $1^{st}$ iteration operation, the $4^{th}$ iteration operation comprises computing according to the elements h[0] to h[$L_{CIR}$−1], where P is an integer between ($L_{CIR}$+2) and $L_F$.

10. The method according to claim 9, wherein in the $P^{th}$ iteration of the $L_F$ iterations of the $1^{st}$ iteration operation, the iteration number of the $4^{th}$ iteration operation p equals $L_{CIR}$; where P is an integer between ($L_{CIR}$+2) and $L_F$; the $4^{th}$ iteration operation computes according to only the elements h[0] to h[$L_{CIR}$−1] and not according to any of the elements h[$L_{CIR}$−1] to h[$L_F$−1].

11. A feed-forward equalizer (FFE) coefficient calculating device, for calculating an FFE coefficient of an FFE in a minimum mean square error decision feedback equalizer (MMSE-DFE) based on a fast transversal recursive squares (FT-RLS) algorithm, the FFE having a length $L_F$, $L_F$ being a positive integer, the FFE coefficient calculating device comprising:
  a priori forward prediction error calculating module, generating a priori forward prediction error $\phi$ according to a channel impulse response (CIR) estimation vector h and a forward prediction coefficient vector w;
  a minimum forward prediction cost calculating module, providing a minimum cost of forward prediction $\alpha$;
  a normalized gain vector calculating module, generating a normalized gain vector c according to the forward prediction coefficient vector w, the minimum cost of forward prediction $\alpha$, and the priori forward prediction error $\phi$, wherein the normalized gain vector c includes elements c[0] to c[$L_F$];
  a posteriori forward prediction error calculating module, providing a posteriori forward prediction error $\psi$;
  a forward prediction coefficient vector calculating module, updating the forward prediction coefficient vector w according to the posteriori forward prediction error $\psi$ and the normalized gain vector c;
  a conversion factor calculating module, providing a conversion factor $\gamma$; and
  a control module, controlling an operation sequence of the above modules to complete a $1^{st}$ iteration operation, generating the FFE coefficient according to the conversion factor $\gamma$ and the normalized gain vector c, and updating the FFE with said FFE coefficient;
  wherein, the $1^{st}$ iteration operation has an $L_F$ number of iterations, and the normalized gain vector calculating module performs a $2^{nd}$ iteration operation having an n number of iterations, and wherein in the $N^{th}$ iteration of the $L_F$ iterations of the $1^{st}$ iteration operation, the number of iterations of the $2^{nd}$ iteration operation n equals N−1; the $2^{nd}$ iteration operation computes the elements all to c[1] to c[N−1], and directly sets the elements c[N] to c[$L_F$] to 0 instead of computing the elements c[N] to c[$L_F$].

12. The FFE coefficient calculating device according to claim 11, wherein in the $1^{st}$ iteration of the $L_F$ iterations of the $1^{st}$ iteration operation, the normalized gain vector calculating module directly sets the elements c[1] to c[$L_F$] to 0 instead of computing the elements c[1] to c[$L_F$].

13. The FFE coefficient calculating device according to claim 11, wherein the forward prediction coefficient vector calculating module performs a $3^{rd}$ iteration operation having an m number of iterations, where m is an integer between 0 and ($L_F$−1).

14. The FFE coefficient calculating device according to claim 13, wherein in the $M^{th}$ iteration of the $L_F$ iterations of the $1^{st}$ iteration operation, the iteration number of the $3^{rd}$ iteration operation m is an integer between (M−1) and $L_F$.

15. The FFE coefficient calculating device according to claim 14, wherein the forward prediction coefficient vector w includes elements w[0] to w[$L_F$−1]; in the $M^{th}$ iteration of the $L_F$ iterations of the $1^{st}$ iteration operation, the forward prediction coefficient vector calculating module computes the elements w[0] to w[M−2] in the $3^{rd}$ iteration operation, where M is an integer greater than 1.

16. The FFE coefficient calculating device according to claim 15, wherein in the $M^{th}$ iteration of the $L_F$ iterations of the $1^{st}$ iteration operation, the iteration number of the $3^{rd}$ iteration operation m equals M−1; the forward prediction coefficient vector calculating module computes the elements w[0] to w[M−2] in the $3^{rd}$ iteration operation, and directly sets the elements w[M−1] to w[$L_F$−1] to 0 instead of computing the elements w[M−1] to w[$L_F$−1].

17. The FFE coefficient calculating device according to claim 16, wherein in the $1^{st}$ iteration of the $L_F$ iterations of the $1^{st}$ iteration operation, the forward prediction coefficient vector calculating module directly sets the elements w[0] to w[$L_F$] to 0 instead of computing the elements w[0] to w[$L_F$].

18. The FFE coefficient calculating device according to claim 11, wherein the CIR estimation vector h includes an $L_F$ number of elements and has a length $L_{CIR}$, the length $L_{CIR}$ is a positive integer and is smaller than $L_F$; the priori forward prediction error calculating module performs a $4^{th}$ iteration operation having a p number of iterations; in the $P^{th}$ iteration of the $L_F$ iterations of the $1^{st}$ iteration operation, the iteration number of the $4^{th}$ iteration operation p is an integer between $L_{CIR}$ and (P−2), where P is an integer between ($L_{CIR}$+2) and $L_F$.

19. The FFE coefficient calculating device according to claim 18, wherein the CIR estimation vector h includes elements h[0] to h[$L_F$−1]; the elements h[0] to h[$L_{CIR}$−1] are greater than a predetermined value, and the elements h[$L_{CIR}$] to h[$L_F$−1] are smaller than the predetermined value; in the $P^{th}$ iteration of the $L_F$ iterations of the $1^{st}$ iteration operation, the priori forward prediction error calculating module computes according to the elements h[0] to h[$L_{CIR}$−1] in the $4^{th}$ iteration operation, where P is an integer between ($L_{CIR}$+2) and $L_F$.

20. The FFE coefficient calculating device according to claim 19, wherein in the $P^{th}$ iteration of the $L_F$ iterations of the $1^{st}$ iteration operation, the iteration number of the $4^{th}$ iteration operation p equals $L_{CIR}$, where P is an integer between ($L_{CIR}$+2) and $L_F$; the priori forward prediction error calculating module computes according to only the elements h[0] to h[$L_{CIR}$−1] and not according to any of the elements h[$L_{CIR}$−1] to h[$L_F$−1].

* * * * *